G. E. CURTISS.
HANDLE.
APPLICATION FILED DEC. 27, 1920.

1,405,971.

Patented Feb. 7, 1922.

Inventor
George E. Curtiss.

By H. E. Hart
his Attorney

UNITED STATES PATENT OFFICE.

GEORGE E. CURTISS, OF NEW BRITAIN, CONNECTICUT, ASSIGNOR TO LANDERS, FRARY & CLARK, OF NEW BRITAIN, CONNECTICUT, A CORPORATION OF CONNECTICUT.

HANDLE.

1,405,971. Specification of Letters Patent. Patented Feb. 7, 1922.

Application filed December 27, 1920. Serial No. 433,246.

*To all whom it may concern:*

Be it known that I, GEORGE E. CURTISS, a citizen of the United States, and a resident of New Britain, county of Hartford, State of Connecticut, have invented certain new and useful Improvements in a Handle, of which the following is a specification.

The object of this invention is to provide improved means for securely and firmly fastening a handle to a cooking utensil or the like.

Figure 1:
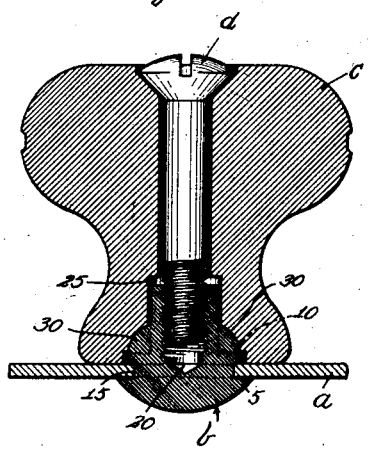
Fig. 1 is a central sectional view showing one embodiment of the present invention.
Figure 2:
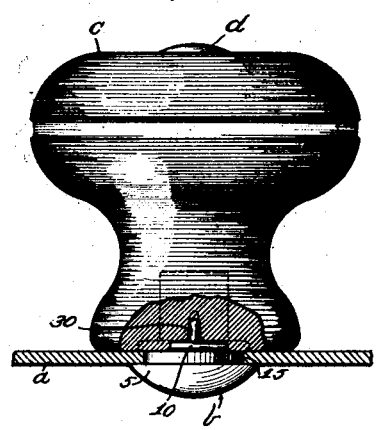
Fig. 2 is an elevational view taken at right angles to Fig. 1 and with a portion of the handle broken away.

Referring to the drawing, *a* denotes a utensil of any suitable sort; *b*, a base member secured in an opening in the wall of the utensil, and *c*, a handle fastened to the base member by a securing member, such as a screw *d*. The base member *b* has a pair of flanges 5, 10 between which the edge of the utensil wall about the opening 15 is clamped. The outer end of the base member has a threaded recess 20 which receives the inner end of the screw *d*. Preferably, the inner end of the handle *c* is chambered as at 25 to receive the base member and it is interengaged therewith as by projections 30 so as to prevent the handle from turning.

Figure 3:
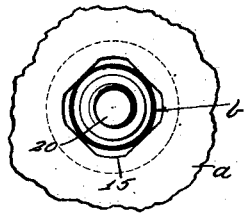
Fig. 3 is an end view of the base member positioned within the opening in the wall of the utensil but before this base member has been operated upon to secure it in place.
Figure 4:
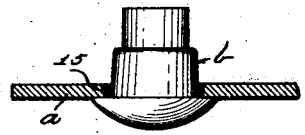
Fig. 4 is a side view of what is shown in Fig. 3.

The base member, before it is secured to the utensil, may have the form shown in Figs. 3 and 4 and by preference the opening 15 in the utensil is non-circular in cross section. To secure the base member in position, the wall thereof is staked down to form the flange 10 and tightly clamp the edge of the opening 15 between this flange and the head 5. During this staking operation, the metal of the stud is caused to flow outwardly and entirely fill the opening 15, thus forming a fluid-tight joint and preventing relative rotation between the base member and the utensil. If desired, the projections or fins 30 may be formed up at the same time as the flange 10. After the base member is thus secured in position, the handle is fastened thereto by the screw *d*. The inner end of the handle may have preformed notches to receive the projections 30 or these notches may be formed by forcing the handle into position and thus causing the projections to bite into the handle.

It will be seen that with the arrangement above described, a very simple and effective means for securing the handle is provided; there is no possibility for fluid to leak through about the base member; the flanges 5, 10 reinforce the utensil wall; and since the base member and handle are fixed against rotation, liability of accidentally unscrewing of the screw is eliminated.

It is, of course, obvious that my invention is susceptible of various modifications and changes which are within the spirit of the invention without departing from the scope of the following claims, it being understood that the present disclosure of my invention is by way of illustration only and it is not to be taken as restrictive of my conception. For instance, the invention is applicable for use in securing a handle at each of its ends to the utensil.

I claim as my invention:—

1. The combination with a vessel having an opening in its wall, of a base member positioned in said opening and provided with integral flanges between which the utensil wall is clamped, said member having a threaded recess in its outer end, a handle, and a screw passing therethrough with its inner end threaded into said recess.

2. The combination with a vessel having an opening in its outer wall, of a base member positioned in said opening and provided with integral flanges between which the utensil wall is clamped, said member having a threaded recess in its outer end, means between said member and vessel for preventing relative rotation therebetween, a handle, and a screw passing through said handle with its inner end threaded into said recess.

3. The combination with a vessel having an opening in its wall, of a base member positioned in said opening and provided with a head engaging one side of said wall and an integral flange swaged tightly down against the other side thereof, said member having a threaded recess in its outer end;

a handle, and a screw passing therethrough, with its inner end threaded into said recess.

4. The combination with a vessel having an opening in its outer wall, of a base member positioned in said opening and provided with integral flanges between which the utensil wall is clamped, said member having a threaded recess in its outer end, means between said member and vessel for preventing relative rotation therebetween, a handle, interengaging means between said handle and member for preventing relative rotation therebetween, and a screw passing through said handle with its inner end threaded into said recess.

5. The combination with a vessel having an opening in its wall, of a base member positioned in said opening and provided with integral flanges between which the utensil wall is clamped, said member having a threaded recess in its outer end, a handle, interengaging projections and notches on said handle, and member preventing rotation therebetween, and a screw passing through said handle with its inner end threaded into said recess.

6. The combination with a vessel having an opening in its wall, of a base member positioned therein provided with a threaded recess in its outer end, a head engaging one side of said wall, an integral flange staked tightly down against the other side thereof and a projection on said flange; a handle having a chamber receiving said base member and a notch receiving said projection, and a screw passing through said handle with its inner end threaded into said recess.

7. The combination with a vessel having a non-circular opening in its wall, of a base member fitted closely in said opening provided with a threaded recess in its outer end, and integral flanges between which said wall is clamped, a handle, means between said handle and base member for preventing rotation therebetween, and a screw passing through said handle with its inner end threaded into said recess.

8. The combination with a vessel having a non-circular opening in its wall, of a base member provided with a portion corresponding in shape to and positioned in said opening, integral flanges between which the utensil is clamped, a recess in its outer end and a projection; a handle having a chamber receiving said base member and a notch receiving said projection, and a screw passing through said handle with its inner end threaded into said recess.

9. That improved method of securing a handle to a utensil, which consists in forming a non-circular opening in the wall of the utensil; positioning a base member in said opening with a head on said member engaging one side of said wall; upsetting the base member to form a flange engaging the other side of said wall and spread the metal of the base member to completely fill said opening; and securing a handle to said base member.

GEORGE E. CURTISS.